(No Model.)

D. D. WESCHLER.
APPARATUS FOR MAKING MALT.

No. 270,619. Patented Jan. 16, 1883.

Witnesses:
A. M. Long.
E. D. Walker.

Inventor.
Daniel D. Weschler
per Halleck & Halleck
Attys.

(No Model.)

D. D. WESCHLER

APPARATUS FOR MAKING MALT.

No. 270,619.   Patented Jan. 16, 1883.

2 Sheets—Sheet 2

Witnesses.
W. R. Edelin.
Robt. H. Porter

Inventor
Daniel D. Weschler
Per Nallock & Nallock
Att's

UNITED STATES PATENT OFFICE.

DANIEL D. WESCHLER, OF ERIE, PENNSYLVANIA.

APPARATUS FOR MAKING MALT.

SPECIFICATION forming part of Letters Patent No. 270,619, dated January 16, 1883.

Application filed March 1, 1882. (No model.)

*To all whom it may concern:*

Be it known that I, DANIEL D. WESCHLER, a citizen of the United States, residing at Erie, in the county of Erie and State of Pennsylvania, have invented new and useful Improvements in Apparatus for Making Malt; and I do hereby declare that the following is a full, clear, and exact description thereof, reference being had to the accompanying drawings and the letters or figures of reference marked thereon.

My invention consists in providing a machine for making malt. By the use of my machine all the stages of the process of making malt can be carried on without manual assistance.

The machine consists of two parts, one of which is for wetting and growing the grain and the other for drying it. These parts are arranged in separate compartments, but are connected together, so as to operate jointly to produce the result aimed at.

In the operation of my machine there is no material change in the process of making malt, the change being wholly with relation to the manipulation of the grain during the process, which is effected wholly by machinery, thereby saving not only the cost of labor, but insuring the manipulation of the grain at the proper time.

The following general description will fully explain my invention.

Figure 1:
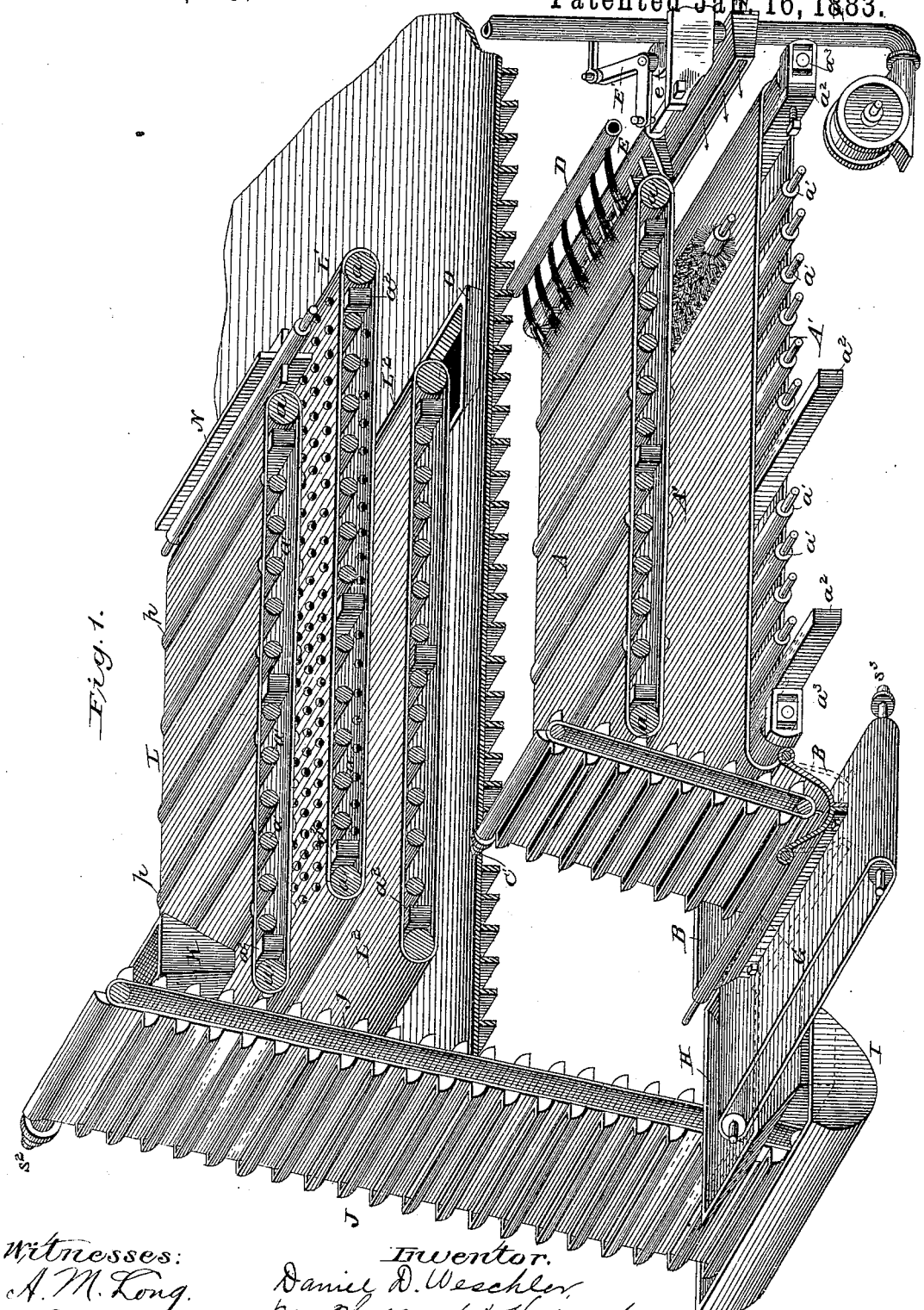
Figure 2:
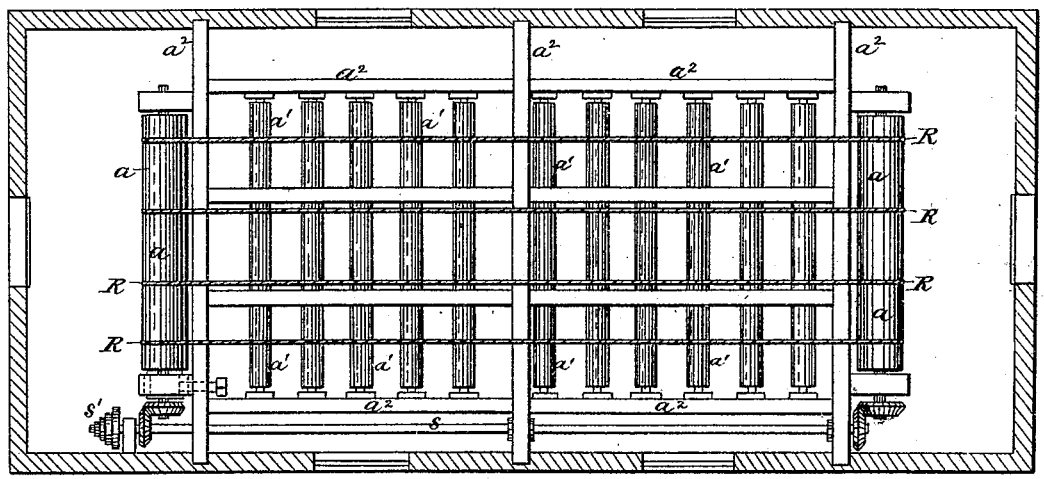
Figure 3:
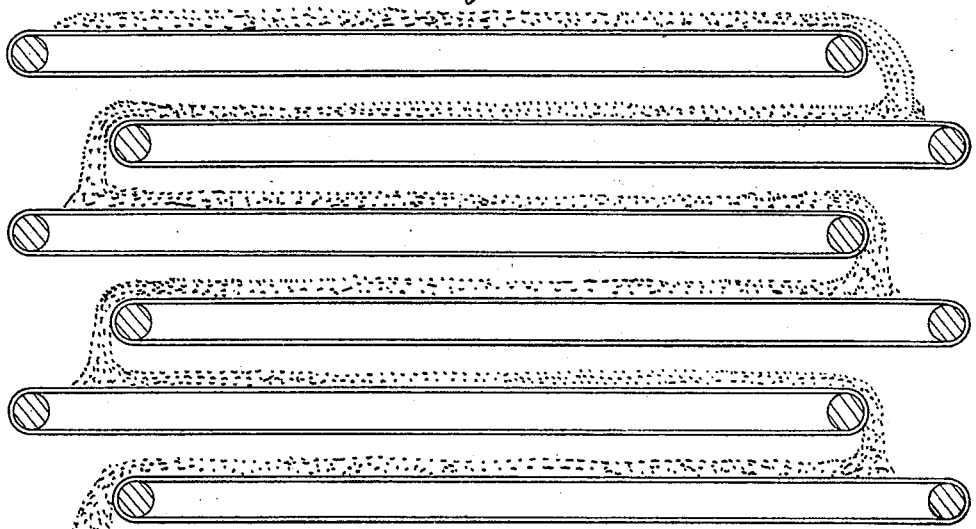
Figure 4:

My machine is illustrated in the accompanying drawings, as follows:

Figure 1 represents a perspective view, showing the wetting and growing machine on the lower floor and a drying-machine upon the upper floor of a malting-house. Fig. 2 is a plan view, showing one of the compartments and the frame-work, shafting, rollers, &c., of the mechanism. Fig. 3 shows an alternative construction of one of the features of the machine, as will be fully set out hereinafter. Fig. 4 is a detail of construction, and will be explained hereinafter.

The general features of my machine are as follows: The grain is taken as it comes from the steeping-vat, and is "couched" on the moving floor A. Below this floor is a second movable floor, A', which is arranged to receive the grain from the floor above. Other similar floors may be arranged below the floor A', as shown in Fig. 3, if desired. Enough grain is received and couched on the upper floor to cover the lower floor the proper thickness or depth for the first stage of the "flooring" process. When the "couch" on the upper floor has stood the proper time the floors are set in motion, the upper one moving slow and the lower one much faster, so that as the grain falls upon it from the floor above it is spread in a much thinner layer than it was on the upper floor. This fills the lower floor and leaves the upper one empty. When it is time to again stir the grain the floors are again set in motion. This time the upper floor is made to move the same as the lower. The grain passes from the lower floor into a trough, B, and is carried by an elevator, C, to the upper floor, where it is spread out evenly by the action of the machine. When it again needs stirring it is again moved onto the lower floor, and so on until finished.

By having a series of floors, as shown in Fig. 3, the grain will not have to be carried back up onto an upper floor, but will drop from one to the other, and as these floors will be made so they can move as fast as or slower or faster than the one from which they receive grain the grain can be spread out thin or thick, as desired. These movable floors are endless belts, and may be made of any desirable material; but I think heavy canvas or duck will be the best material. The aprons or belts will pass over large propelling-rollers, and throughout their length they will be supported on a series of supporting-rollers to prevent sagging. After the grain has been germinated properly it is run off of the floors onto a conveyer, G, which carries it to the kiln or drying-department, where it falls into a hopper, I, and thence by an elevator, J, it is carried up and deposited on a moving floor, L, which is made of wire-gauze or of perforated metal. Here it remains until it is necessary to stir it, when it is carried by the floor onto a similar one below, and so on until it is thoroughly dried.

The details of construction are as follows:

A A' are the movable endless floors on which the grain is couched and floored.

*a a a a* are the rollers over which the endless floors pass and by which they are moved.

$a'$ $a'$ $a'$, &c., are series of small supporting-rollers, which sustain the endless floors and keep them from sagging.

L L are the kiln endless floors, which are mounted and propelled the same as the floors A A'.

$p$ $p$ are strips fastened across both the wire floors and the canvas floors to keep them from contracting in width and from wrinkling up as they run over the rollers $a$ $a$. The rollers $a$ $a$ are provided with adjustable journal-boxes $a^3$, so as to provide for keeping the endless floors in perfect tension. The supporting-rollers $a'$ $a'$ $a'$ are thoroughly supported and sustained by girders $a^2$ $a^2$ $a^2$, &c.

B is the trough into which the grain passes as it runs from the floor A', and the grain as it comes from the steeping-vat had better enter the machine at this point. This hopper or trough is made so it can be opened at the bottom, as shown by dotted lines in Fig. 1, so as to allow the grain, when ready for the kiln, to pass onto the conveyer.

C is the elevator which carries the grain from the trough B to the floor A. It is of common construction, being a series of buckets on an endless belt. The buckets are of the same width as the floor A, and therefore spread the grain evenly on the floor.

D is a perforated water-pipe so arranged as to sprinkle the grain when it passes from one floor to another if it needs more wetting.

E is a shaking frame, which stirs the grain as it falls from one floor to the other.

F' is an air-blower, and F is an air-nozzle, which extends the width of the floors and blows against the grain as it falls from one floor to the other, and serves to thoroughly air the grain.

M is a brush, which revolves against the under side of the floor A, and brushes off from it any grain which may stick to it.

G is an endless-belt conveyer, which receives the grain when ready for the kiln and carries it to the hopper H in the drying-compartment; or the throat of the hopper H may pass through the wall separating the two compartments, and thus serve as the means of communicating between them. The hopper H discharges into a trough, I, from which an elevator carries the grain to the hopper K over the floor L.

N is a flutter, which works in the grain as it passes from the floor L to L', and serves to turn the grain over as it falls from L to L'.

O is a shute, which receives the grain when dried and carries it off from the kiln.

In Fig. 2 is shown a plan of one of the compartments, showing the arrangement of the rollers, the girders, and other parts. The small rollers $a'$ are all flush with the top of the girders, and when longitudinal girders are used, as there shown, the small rollers are journaled in them, being in sections, as shown. These rollers $a'$ serve not only as supports, but as friction-rollers to facilitate the movement of the floors. In this diagram Fig. 2 are shown wire ropes R, running over the rollers $a$, or a sheave, $r$, incorporated into these rollers. In Fig. 4 the sheave and rope are also shown. The purpose of these ropes is to serve as carriers for the wire-gauze which is attached to them, as the gauze would probably not have strength enough without these ropes to serve the purpose designed.

In Fig. 2 is shown a shaft, $s'$, from which the rollers are moved by gearing. One of these shafts is arranged by the side of each endless floor, and they are provided with cone-pulley $s$, by which means the movements of the floors are timed.

If desired, the wire ropes may be used in connection with the canvas floors.

While I do not desire to be limited to the use of canvas in the material of which the floors are constructed, I still believe it to be the best material for the purpose. Although it may rot out in time, it will last a good while, and is easily replaced. It will not oxidize, and the grain does not lie upon it in one place long enough to mildew.

In my machine the grain can lie thicker on the floors than on ordinary floors, because there is a free circulation of air below the floors, which are thin, and the grain at the bottom will not heat. Besides this, the grain can be turned and aired so quickly that there is not the necessity for spreading it out so thin. While the process of couching will take as long probably in my machine as in the old way, the process of flooring can be carried on more rapidly, because the grain can be kept at a more even temperature.

What I claim as new is—

1. In a machine for making malt, the combination, with the floors for holding the grain while germinating and those for holding it while drying, of conveyer G, of hopper H, of trough I, and of elevator J.

2. In a machine for making malt, the combination, with the floors for working the grain while germinating and those for holding it while drying, of elevator C, trough B, conveyer G, hopper H, trough I, and elevator J.

In testimony that I claim the foregoing I have hereunto set my hand this 25th day of February, 1882.

DANIEL D. WESCHLER.

Witnesses:
JNO. K. HALLOCK,
W. R. EDELEN.